(12) United States Patent
Ogawa et al.

(10) Patent No.: US 8,698,986 B2
(45) Date of Patent: Apr. 15, 2014

(54) LIQUID CRYSTAL DISPLAY DEVICE

(75) Inventors: Katsuya Ogawa, Osaka (JP); Kazuyoshi Fujioka, Osaka (JP); Tomoo Furukawa, Osaka (JP); Masaaki Saitoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/255,317

(22) PCT Filed: Oct. 27, 2009

(86) PCT No.: PCT/JP2009/068431
§ 371 (c)(1),
(2), (4) Date: Sep. 8, 2011

(87) PCT Pub. No.: WO2010/109714
PCT Pub. Date: Sep. 30, 2010

(65) Prior Publication Data
US 2011/0317113 A1 Dec. 29, 2011

(30) Foreign Application Priority Data
Mar. 23, 2009 (JP) ................. 2009-070895

(51) Int. Cl.
*G02F 1/1335* (2006.01)
*G02F 1/1337* (2006.01)

(52) U.S. Cl.
USPC .......................... 349/123; 349/114

(58) Field of Classification Search
USPC ............. 349/56, 113, 114, 122, 138, 123
See application file for complete search history.

(56) References Cited

U.S. PATENT DOCUMENTS

| | | | | |
|---|---|---|---|---|
| 6,927,817 | B2 * | 8/2005 | Itoh et al. | 349/113 |
| 7,456,916 | B2 * | 11/2008 | Kaneko | 349/114 |
| 7,586,568 | B2 * | 9/2009 | Wu et al. | 349/114 |
| 7,605,890 | B2 * | 10/2009 | Ozawa et al. | 349/114 |
| 2004/0227876 | A1 * | 11/2004 | Okumura | 349/114 |
| 2007/0109473 | A1 * | 5/2007 | Higa et al. | 349/114 |
| 2008/0100784 | A1 | 5/2008 | Haruyama | |
| 2008/0309853 | A1 * | 12/2008 | Ge et al. | 349/96 |
| 2010/0110318 | A1 | 5/2010 | Ogawa et al. | |
| 2011/0317113 | A1 * | 12/2011 | Ogawa et al. | 349/113 |

FOREIGN PATENT DOCUMENTS

| | | |
|---|---|---|
| JP | 2004-279566 | 10/2004 |
| JP | 2008-111903 | 5/2008 |
| WO | WO 2008/129734 | 10/2008 |

OTHER PUBLICATIONS

International Search Report for PCT/JP2009/068431, mailed Dec. 15, 2010.

* cited by examiner

*Primary Examiner* — Mark Robinson
*Assistant Examiner* — Robert Tavlykaev
(74) *Attorney, Agent, or Firm* — Nixon & Vanderhye P.C.

(57) ABSTRACT

The present invention provides a liquid crystal display device capable of suppressing alignment disorder of liquid crystal and having satisfactory VR characteristics. According to the present invention, a liquid crystal display device includes a pair of substrates and a liquid crystal layer interposed between the pair of substrates, the liquid crystal display device having a reflective region and a transmissive region. One of the pair of substrates includes a longitudinal projecting portion and a liquid-crystal-layer-thickness adjusting portion for setting a liquid crystal layer thickness in the reflective region to be smaller than a liquid crystal layer thickness in the transmissive region. At least a part of the projecting portion is arranged without a gap along at least a part of a step portion of the liquid-crystal-layer-thickness adjusting portion.

13 Claims, 4 Drawing Sheets

LIQUID CRYSTAL DISPLAY DEVICE

This application is the U.S. national phase of International Application No. PCT/JP2009/068431 filed 27 Oct. 2009 which designated the U.S. and claims priority to JP Patent Application No. 2009-070895 filed 23 Mar. 2009, the entire contents of each of which are hereby incorporated by reference.

TECHNICAL FIELD

The present invention relates to a liquid crystal display device. More particularly, the present invention relates to a liquid crystal display device suitable for use as a transflective liquid crystal module.

BACKGROUND ART

Liquid crystal display devices have advantageous features, such as thin profile, light weight, and low power consumption, which allow their wide use in electronic apparatuses such as monitors, projectors, mobile phones, and personal digital assistants (PDAs). Such liquid crystal display devices include a transmissive type, a reflective type, and a transflective type (both reflective and transmissive). Transmissive liquid crystal display devices perform display by outwardly emitting light guided from a back side, for example, light from a backlight provided at a back side of a liquid crystal display panel, to the inside of the liquid crystal display panel. Reflective liquid crystal display devices perform display by reflecting light guided from a front side (screen side), such as ambient light and light from a front light, to the inside of the liquid crystal display panel. In contrast, transflective liquid crystal display devices perform transmissive display by using light from the back side in a relatively dark environment, such as an indoor environment, and perform reflective display by using light from the front side in a relatively bright environment, such as an outdoor environment. Thus, transflective liquid crystal display devices provide both the excellent visibility of reflective liquid crystal display devices in a bright environment and the excellent visibility of transmissive liquid crystal display devices in a dark environment.

With regard to transflective liquid crystal display devices, a liquid crystal display device has been disclosed which has the following structure for achieving a bright display with a wide viewing angle in both transmissive display and reflective display (see Patent Document 1, for example). That is, a liquid crystal layer is formed of liquid crystal with a negative dielectric anisotropy which is vertically aligned in an initial alignment state, and a pair of substrates respectively include electrodes for driving the liquid crystal formed on the side that faces the liquid crystal layer. Alignment regulating means that regulates the alignment of the liquid crystal is provided on the electrode on at least one of the substrates. The alignment regulating means includes a slit-shaped opening formed by opening a longitudinal hole in the electrode and/or a longitudinal protrusion formed on the electrode and is made of a dielectric material. A liquid-crystal-layer-thickness adjusting layer is formed between at least one of the pair of substrates and the liquid crystal layer. The liquid-crystal-layer-thickness adjusting layer is provided for setting the liquid crystal layer thickness in the transmissive display region to be greater than the liquid crystal layer thickness in the reflective display region. The liquid-crystal-layer-thickness adjusting layer has an inclined surface in the vicinity of a boundary between the transmissive display region and the reflective display region so that the layer thickness thereof varies continuously. The longitudinal direction of the opening and/or the protrusion and the longitudinal direction of the inclined surface of the liquid-crystal-layer-thickness adjusting layer are arranged in such a manner as to intersect each other in a plan view.

Thus, a so-called multi-gap structure in which a liquid-crystal-layer-thickness adjusting portion is provided in a cell has been proposed as a way of matching voltage-transmission luminance characteristics in the transmissive region with voltage-reflection luminance characteristics in the reflective region in a transflective liquid crystal display device.

In contrast, a liquid crystal display device has been disclosed which has the following structure, instead of the multi-gap structure, as an art for achieving voltage-reflection brightness characteristics (VR characteristics) which is less likely to cause tone reversal (see Patent Document 2, for example). That is, the liquid crystal display device includes a pair of substrates and a liquid crystal layer interposed between the pair of substrates. The liquid crystal display device is provided with a transmissive region and a reflective region. The reflective region includes a first section and a second section. The first section has a liquid crystal layer thickness greater than ½ of a liquid crystal layer thickness in the transmissive region but not greater than the liquid crystal layer thickness in the transmissive region. The second section has a liquid crystal layer thickness greater than the liquid crystal layer thickness in the transmissive region.

[Patent Document 1]
Japanese Kokai Publication No. 2004-279566 (JP-A 2004-279566)
[Patent Document 2]
WO 2008/129734

DISCLOSURE OF INVENTION

With the art described in Patent Document 1, however, light leakage may occur in a black screen state, which leads to a reduction in contrast in transmissive display.

With the art described in Patent Document 2, the VR characteristics cannot be sufficiently adjusted when the configuration forces the occupancy of the region having no projection for controlling the alignment of the liquid crystal to increase. In such a case, reversal of the VR characteristics may occur at a relatively low voltage.

In light of the above-described situation, an object of the present invention is to provide a liquid crystal display device capable of suppressing alignment disorder of liquid crystal and having satisfactory VR characteristics.

The present inventors conducted various studies regarding liquid crystal display devices capable of suppressing alignment disorder of liquid crystal and having satisfactory VR characteristics. As a result, first, the following facts regarding the prior art were found. That is, in the art described in Patent Document 1, the inclined surface of the liquid-crystal-layer-thickness adjusting layer is positioned in the transmissive region. Therefore, in a black screen state, the alignment direction of the liquid crystal becomes perpendicular to the inclined surface and tilted with respect to the normal direction of a display surface. Accordingly, alignment disorder of the liquid crystal occurs at the inclined surface in a black screen state. As a result, light leakage occurs in a black screen state, which leads to a reduction in contrast in transmissive display. Thus, the present inventors have found out that the alignment disorder of the liquid crystal is caused by the side surface of the liquid-crystal-layer-thickness adjusting layer in the conventional liquid crystal display.

The art described in Patent Document 2 is based on the combination of three types of VR characteristics, which are the VR characteristics in the region where the projection for controlling the alignment of the liquid crystal is provided, the VR characteristics in the region having no projection, and the VR characteristics in the region where a recess is formed in the substrate at the back side. However, the liquid crystal layer thickness is large in the region having no projection, and reversal of the VR characteristics easily occurs in this region. Thus, the present inventors have found out that, when the occupancy of this region in the entire reflective region increases, the influence thereof on the entire reflective region increases, which leads to easy reversal of the VR characteristics of the entire reflective region.

As a result of further studies, the present inventors have found out that suppression of alignment disorder of liquid crystal caused by a side surface of a liquid-crystal-layer-thickness adjusting portion and satisfactory VR characteristics can be achieved by at least a part of the side surface of the liquid-crystal-layer-thickness adjusting portion arranged without a gap along at least a part of a longitudinal projecting portion on one of the pair of substrates holding the liquid crystal layer therebetween. Accordingly, the present inventors have solved the above-described problems and completed the present invention.

More specifically, according to the present invention, a liquid crystal display device includes a pair of substrates and a liquid crystal layer interposed between the pair of substrates, the liquid crystal display device having a reflective region and a transmissive region. One of the pair of substrates includes a liquid-crystal-layer-thickness adjusting portion for setting a liquid crystal layer thickness in the reflective region to be smaller than a liquid crystal layer thickness in the transmissive region and a longitudinal projecting portion. At least a part of the projecting portion is arranged without a gap along at least a part of a side surface of the liquid-crystal-layer-thickness adjusting portion.

The configuration of the liquid crystal display device of the present invention is not especially limited as long as it essentially includes such components. The liquid crystal display may or may not include other components.

Preferable embodiments of the liquid crystal display device of the present invention are mentioned in more detail below.

At least a part of the projecting portion may be arranged without a gap along at least a part of a step portion of the liquid-crystal-layer-thickness adjusting portion.

Preferably, a part of the projecting portion which adjoins the side surface overlaps the liquid-crystal-layer-thickness adjusting portion. This configuration more surely enables production of the liquid crystal display device of the present invention. Thus, a part of the projecting portion which adjoins the step portion may overlap the step portion.

Preferably, a height H1 of the projecting portion and a height H2 of the liquid-crystal-layer-thickness adjusting portion satisfy the relationship H1≥H2. If H1 and H2 satisfy H1<H2, the alignment control of the liquid crystal in the area where the projecting portion is arranged may be insufficient, resulting in alignment disorder.

The liquid-crystal-layer-thickness adjusting portion may include a liquid-crystal-layer-thickness adjusting layer for setting the liquid crystal layer thickness in the reflective region to be smaller than the liquid crystal layer thickness in the transmissive region. The liquid-crystal-layer-thickness adjusting layer used as the liquid-crystal-layer-thickness adjusting portion allows easier formation of the liquid-crystal-layer-thickness adjusting portion at a desired position. For the same reason, the step portion may be an edge portion of a liquid-crystal-layer-thickness adjusting layer for setting the liquid crystal layer thickness in the reflective region to be smaller than the liquid crystal layer thickness in the transmissive region.

At least a part of the projecting portion may be arranged without a gap along at least a part of a portion of the side surface which is positioned on a center side of a pixel. Thus, the projecting portion, which is commonly arranged closer to the central area of the pixel than the liquid-crystal-layer-thickness adjusting portion, and the liquid-crystal-layer-thickness adjusting portion can be more easily arranged in accordance with the above-described configuration. Similarly, at least a part of the projecting portion may be arranged without a gap along at least a part of a portion of the step portion which is positioned on a center side of a pixel.

At least a part of the projecting portion may be arranged without a gap along the entirety of a portion of the side surface which is positioned on a center side of a pixel. This arrangement allows more efficient exertion of the effects of the present invention. In this case, a portion of the side surface which does not adjoin the projecting portion is preferably arranged along a boundary line between pixels. This arrangement suppresses adverse influence on the display even when the alignment disorder of the liquid crystal occurs in the vicinity of an area where the step portion of the liquid-crystal-layer-thickness adjusting portion does not adjoin the projecting portion.

For the same reason, at least a part of the projecting portion may be arranged without a gap along the entirety of a portion of the step portion which is positioned on a center side of a pixel. In this case, a part of the step portion which does not adjoin the projecting portion is preferably arranged along a boundary line between pixels.

Effects of the Invention

According to the liquid crystal display device of the present invention, alignment disorder of liquid crystal can be suppressed and satisfactory VR characteristics can be achieved.

BRIEF DESCRIPTION OF THE DRAWINGS

FIG. 1(a) is a plan view and FIG. 1(b) is a cross-sectional view of FIG. 1(a) taken along line A-B.

FIG. 2(a) is a plan view and FIG. 2(b) is a sectional view of FIG. 2(a) taken along line C-D.

MODES FOR CARRYING OUT THE INVENTION

Figure 1:
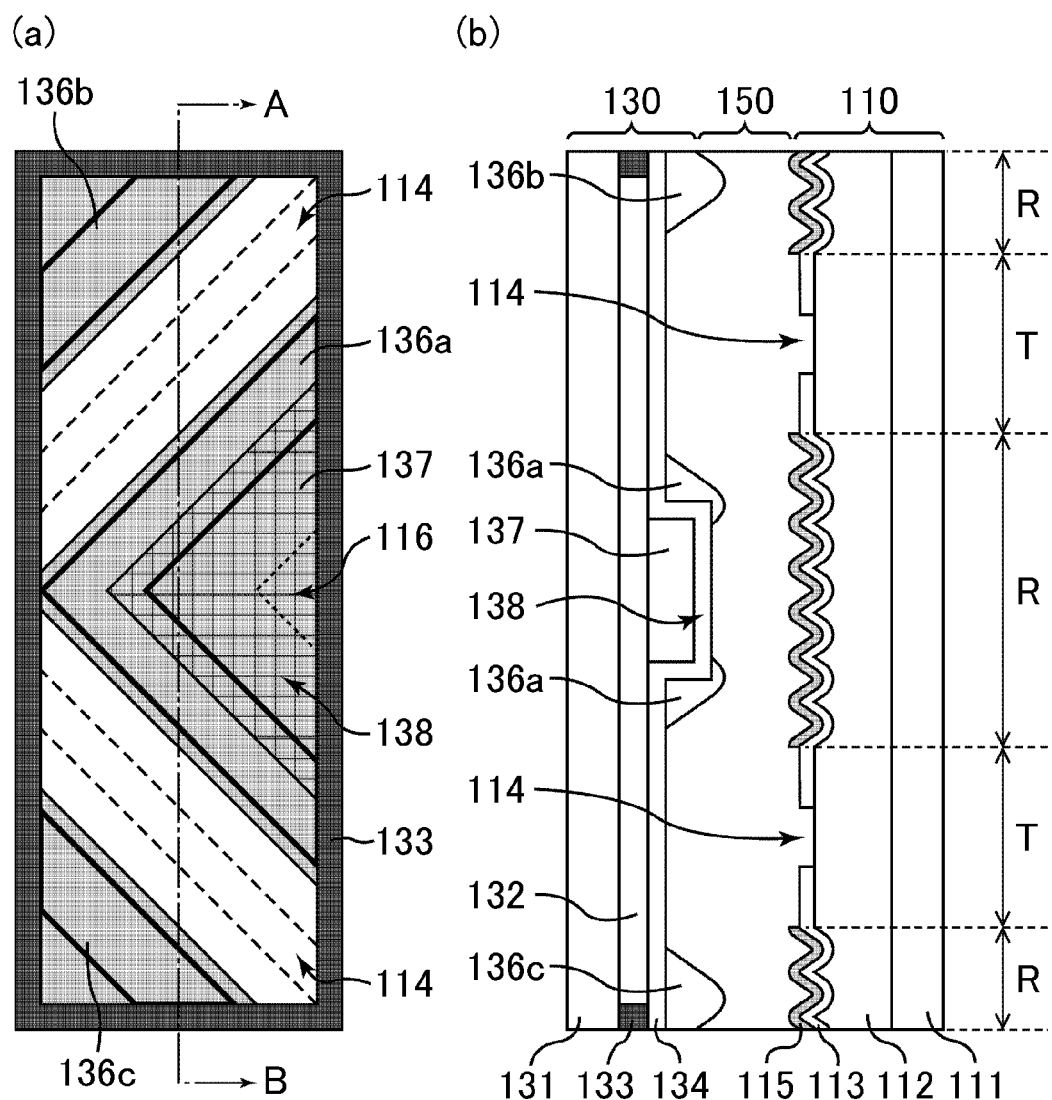
FIG. 1 are schematic diagrams each illustrating a liquid crystal display device according to a first embodiment.

In this description, the height H1 of a projecting portion is the height of the projecting portion (only those arranged without a gap along a liquid-crystal-layer-thickness adjusting portion) from a certain reference plane (e.g., a substrate surface). In addition, the height H2 of the liquid-crystal-layer-thickness adjusting portion is the height of the liquid-crystal-layer-thickness adjusting portion from the reference plane.

The present invention will be mentioned in more detail referring to the drawings in the following embodiments, but is not limited to these embodiments.

First Embodiment

1. Overall Structure

As illustrated in FIG. 1, a liquid crystal display device according to the present embodiment is a vertical alignment liquid crystal display device including a first substrate 110 on a back side, a liquid crystal layer 150, and a second substrate 130 on a screen side, which are arranged in this order.

The liquid crystal layer 150 is interposed between the first substrate 110 and the second substrate 130, which are opposed to each other, and contains a nematic liquid crystal material with a negative dielectric anisotropy. The liquid crystal in the liquid crystal layer 150 is vertically aligned in an initial alignment state.

The liquid crystal display device according to the present embodiment is a transflective liquid crystal display device in which each color pixel (a single monochrome pixel in the case of monochrome display) includes a reflective region R which performs reflective display and a transmissive region T which performs transmissive display.

Each of the first substrate 110 and the second substrate 130 has a circularly polarizing plate (not shown) including a phase difference layer at a side (outer side) opposite to the side facing the liquid crystal layer 150. A pair of linearly polarizing plates (not shown) are provided outside the respective circularly polarizing plates, and are disposed in a crossed Nicols arrangement. Thus, the liquid crystal display device of the present embodiment is a normally black liquid crystal display device. A backlight (not shown) is disposed behind the linearly polarizing plate at the side of the first substrate 110.

The second substrate 130 includes the following components arranged in the mentioned order: a glass substrate 131; a color layer 132 and a black matrix 133 formed on the glass substrate 131; a liquid-crystal-layer-thickness adjusting layer 137 (region hatched with a grid pattern in FIG. 1(a)) formed on the color layer 132 and the black matrix 133; a counter electrode 134 formed on the color layer 132, the black matrix 133, and the liquid-crystal-layer-thickness adjusting layer 137; longitudinal projecting portions (protrusions) 136 (136a, 136b, and 136c) formed on the counter electrode 134; and a vertical alignment film (not shown) that covers these components.

The color layer 132 and the black matrix 133 are formed of, for example, an acrylic resin containing pigment. The liquid-crystal-layer-thickness adjusting layer 137 is formed of a dielectric material (insulating film), such as an acrylic resin. The counter electrode 134 is provided in common for each pixel to drive the liquid crystal, and is formed of a transparent conductive film, such as an ITO film. The projecting portions 136 are formed of a dielectric material (insulating material), such as a phenolic novolac resin. The vertical alignment film is formed of a polyimide resin.

The projecting portions (projections) 136 are structure elements for controlling (regulating) the alignment of the liquid crystal (alignment-controlling structure elements), and include inclined surfaces that are inclined with respect to the planes of the substrates 110 and 130 (or with respect to the vertical alignment direction of the liquid crystal). The alignment of the liquid crystal, in particular, a tilting direction of the vertically aligned liquid crystal, is regulated along the inclinations of the inclined surfaces. More specifically, owing to the inclined surfaces of the projecting portions 136, the liquid crystal near the projecting portions 136 is aligned obliquely (in directions perpendicular to the inclined surfaces). When a display surface is viewed from the front, the projecting portions 136 extend obliquely and include a substantially V-shaped projecting portion 136a positioned on a center side of a pixel and linear projecting portions 136b and 136c positioned in upper and lower corners of the pixel.

The liquid-crystal-layer-thickness adjusting layer 137 constitutes a liquid-crystal-layer-thickness adjusting portion 138 that locally adjusts a liquid crystal layer thickness (thickness of the liquid crystal layer 150) by its own thickness. The liquid-crystal-layer-thickness adjusting portion 138 is provided in the reflective region R so that the liquid crystal layer thickness (thickness of the liquid crystal layer 150) in the transmissive region T is greater than the liquid crystal layer thickness (thickness of the liquid crystal layer 150) in the reflective region R. Thus, the liquid crystal display device of the present embodiment has a multi-gap structure in which the liquid crystal layer thickness (cell gap) differs between the transmissive region T and the reflective region R.

The liquid-crystal-layer-thickness adjusting layer 137 is selectively disposed in all of the areas which are each surrounded by the projecting portion 136a and a boundary line between adjacent pixels (the outer periphery of each pixel). The projecting portion 136a is arranged without a gap along the outer periphery (edge portion) of the liquid-crystal-layer-thickness adjusting layer 137 on the center side of the pixel. In other words, the liquid-crystal-layer-thickness adjusting portion 138 is selectively provided in the entire area surrounded by the projecting portion 136a and the boundary line between adjacent pixels (the outer periphery of each pixel), and the projecting portion 136a is arranged without a gap along a step portion of the liquid-crystal-layer-thickness adjusting layer 137 on the center side of the pixel. Thus, the projecting portion 136a is arranged without a gap along a longitudinal direction of a portion of a side surface of the liquid-crystal-layer-thickness adjusting portion 138 excluding a portion positioned on the boundary line between pixels. The liquid-crystal-layer-thickness adjusting layer 137 has a substantially triangular shape in a plan view.

Owing to the presence of the liquid-crystal-layer-thickness adjusting portion 138, the thickness of the liquid crystal layer 150 in the reflective region R is smaller than the thickness of the liquid crystal layer 150 in the transmissive region T. As a result, retardation in the reflective region R and retardation in the transmissive region T can be set sufficiently close to each other or substantially equal to each other. Therefore, satisfactory VR characteristics which suppress tone reversal can be achieved.

The first substrate 110 includes the following components arranged in the mentioned order: a glass substrate 111; an insulating layer (interlayer insulating film) 112 formed on a side of the glass substrate 111 that faces the liquid crystal layer 150; a pixel electrode 113 formed on the insulating layer 112; a reflective film (reflective electrode) 115 formed on the pixel electrode 113; and a vertical alignment film (not shown) that covers these components.

The insulating layer 112 is formed of a dielectric material (insulating film), such as an acrylic resin. The pixel electrode 113 is provided for each pixel to drive the liquid crystal, and is formed of a transparent conductive film, such as an ITO film. The reflective film 115 is formed of a film of a metal, such as aluminum or silver, which has a high reflectance. The vertical alignment film is formed of a polyimide resin.

When viewed in a direction perpendicular to the display surface, the pixel electrode 113 has slits 114 (regions shown by broken lines in FIG. 1(a)) that extend parallel to the projecting portions 136. The pixel electrode 113 is sectioned into parts by the slits 114, and the parts are connected to each other by connecting portions (not shown) that are provided in a part of the regions shown by the broken lines in FIG. 1(a). In addition, when viewed in a direction perpendicular to the display surface, the pixel electrode 113 has a substantially triangular cut portion 116 (region shown by dotted lines in FIG. 1(a)) that have sides parallel to sides of the projecting portion 136a.

The slits 114 and the cut portion 116 are also structure elements for controlling (regulating) the alignment of the liquid crystal (alignment-controlling structure elements). The slits 114 and the cut portion 116 generate an oblique electric field so as to regulate the tilting direction of the liquid crystal in a vertically aligned state when a voltage is applied. The slits 114, the cut portion 116, and the projecting portions 136 regulate the alignment of the liquid crystal.

Instead of forming the slits 114 and the cut portion 116 in the pixel electrode 113, projecting portions made of a resin and having certain inclined surfaces may be formed, for example, on the pixel electrode 113. This can also regulate the tilting direction of liquid crystal molecules.

The first substrate 110 has: a TFT (not shown) as a switching element; a gate line (not shown), a source line (not shown), and a drain electrode (not shown) which are connected to the TFT; and an auxiliary capacity line (not shown), and etc., between the glass substrate 111 and the insulating layer 112. The pixel electrode 113 is connected to the drain electrode of the TFT through a contact hole (not shown) formed in the insulating layer 112.

The insulating layer 112 has an irregular pattern in the reflective region R on the side that faces the liquid crystal layer 150. The pixel electrode 113 and the reflective film 115, which are formed on the irregular pattern, also have a similar irregular pattern.

The reflective film 115 reflects incident light (external light and the like) from the screen side of the liquid crystal display device. The region in which the reflective film 115 is provided corresponds to the reflective region R. The region in which the reflective film 115 is not provided corresponds to the transmissive region T.

When viewed in a direction perpendicular to the display surface, the reflective film 115 (the reflective region R) is arranged in such a manner as to cover all of the regions where the projecting portions 136 are provided in the pixel. Accordingly, the reflective region R includes at least a first region, a second region, a third region, and a fourth region. In the first region, the projecting portion 136a is not present but the liquid-crystal-layer-thickness adjusting portion 138 is present. In the second region, the projecting portion 136a is present. In the third region, the projecting portion 136b or 136c is present. In the fourth region, neither the projecting portions 136 (projecting portions 136a, 136b, and 136c) nor the liquid-crystal-layer-thickness adjusting portion 138 is present. Therefore, combination of at least the VR characteristics in the first region, the VR characteristics in the second region, the VR characteristics in the third region, and the VR characteristics in the fourth region determines the VR characteristics of the reflective region R.

The thickness of the liquid-crystal-layer-thickness adjusting layer 137, namely, the liquid crystal layer thickness at the liquid-crystal-layer-thickness adjusting portion 138, is not particularly limited. The thickness may be set as appropriate so that satisfactory VR characteristics can be achieved. The area of the liquid-crystal-layer-thickness adjusting layer 137 (liquid-crystal-layer-thickness adjusting portion 138) is also not particularly limited, and may be set as appropriate so that satisfactory VR characteristics can be achieved.

2. Main Structural Features (1) The projecting portion 136a is formed along the edge portion of the liquid-crystal-layer-thickness adjusting layer 137 (which corresponds to a step portion of the liquid-crystal-layer-thickness adjusting portion 138 in the present embodiment and the same shall apply in the following) without leaving a gap between the projecting portion 136a and the liquid-crystal-layer-thickness adjusting layer 137 (which corresponds to the liquid-crystal-layer-thickness adjusting portion 138 in the present embodiment and the same shall apply in the following). In other words, the projecting portion 136a is formed along the side surface of the liquid-crystal-layer-thickness adjusting portion 138 without leaving a gap between the projecting portion 136a and the liquid-crystal-layer-thickness adjusting portion 138.

(2) Preferably, the liquid-crystal-layer-thickness adjusting layer 137 (liquid-crystal-layer-thickness adjusting portion 138) is formed along the projecting portion 136a, and is formed in an area of the reflective region R which is surrounded by the projecting portion 136a and a boundary line between pixels (the outer periphery of each pixel).

(3) Preferably, the projecting portion 136a is formed in such a manner as to override the liquid-crystal-layer-thickness adjusting layer 137 (liquid-crystal-layer-thickness adjusting portion 138).

The height of the projecting portion 136a that adjoins the liquid-crystal-layer-thickness adjusting layer 137 is not necessarily the same as the height of the projecting portions 136b and 136c that do not adjoin the liquid-crystal-layer-thickness adjusting layer 137. In the case where the projecting portion 136a and the projecting portions 136b and 136c are formed by the same process, the height of the projecting portion 136a may be greater than the height of the projecting portions 136b and 136c by the thickness of the liquid-crystal-layer-thickness adjusting layer 137 that the projecting portion 136a overrides.

(4) When viewed in a direction perpendicular to the display surface, the reflective region R covers all of the regions where the projecting portions 136 are provided. In other words, the reflective film 115 is arranged such that all of the regions including the projecting portions 136 in plan view serve as the reflective region R.

3. Advantageous Effects (1) The structure described above in item 2. (1) allows the side surface (edge portion) of the liquid-crystal-layer-thickness adjusting layer 137 (liquid-crystal-layer-thickness adjusting portion 138) to be arranged under the projecting portion 136a. Therefore, the alignment of the liquid crystal near the side surface (edge portion) of the liquid-crystal-layer-thickness adjusting layer 137, which may adversely affect the alignment of the liquid crystal, can be controlled by the projecting portion 136a. Thus, in the liquid crystal display device having a multi-gap structure, the alignment disorder of the liquid crystal due to the liquid-crystal-layer-thickness adjusting portion 138 can be suppressed. In addition, this structure allows adjustment of the thickness of the liquid-crystal-layer-thickness adjusting layer 137 for setting the liquid crystal layer thickness in the reflective region R to be smaller than the liquid crystal layer thickness in the transmissive region T. Therefore, the liquid crystal layer thickness in the reflective region R can be set in a manner such that satisfactory VR characteristics can be achieved.

(2) The structure described above in item 2. (2) allows an outer peripheral portion of the liquid-crystal-layer-thickness adjusting layer 137 (liquid-crystal-layer-thickness adjusting portion 138) to be arranged under the projecting portion 136a or at the outer periphery of the pixel. More specifically, the projecting portion 136a can be arranged without a gap along the entirety of a portion of the side surface (edge portion) of the liquid-crystal-layer-thickness adjusting layer 137 (liquid-crystal-layer-thickness adjusting portion 138) which is positioned on the center side of the pixel. In addition, a portion of the side surface (edge portion) of the liquid-crystal-layer-thickness adjusting layer 137 (liquid-crystal-layer-thickness adjusting portion 138) which does not adjoin the projecting portion 136a can be arranged along a boundary line between pixels. Accordingly, the projecting portion 136a can effectively control the alignment of the liquid crystal near the portion of the side surface (edge portion) of the liquid-crystal-layer-thickness adjusting layer 137 (liquid-crystal-layer-thickness adjusting portion 138) which is positioned on the center side of the pixel. In addition, even when the alignment of the liquid crystal is disordered in an area near the portion of the side surface (edge portion) of the liquid-crystal-layer-thickness adjusting layer 137 (liquid-crystal-layer-thickness adjusting portion 138) at the outer periphery of the pixel, the area in which the alignment of the liquid crystal is disordered can be placed in a non-display region (region where light is blocked by the black matrix 133, wiring, etc.). In this manner, the liquid-crystal-layer-thickness adjusting layer 137 (liquid-crystal-layer-thickness adjusting portion 138) can be formed without influencing the alignment direction of the liquid crystal in the display region. In addition, in the liquid crystal display device having a multi-gap structure, the alignment disorder of the liquid crystal due to the liquid-crystal-layer-thickness adjusting portion 138 (liquid-crystal-layer-thickness adjusting layer 137) can be further suppressed.

As described above, the projecting portion 136a is arranged without a gap along the portion of the side surface (edge portion) of the liquid-crystal-layer-thickness adjusting layer 137 (liquid-crystal-layer-thickness adjusting portion 138) which is positioned on the center side of the pixel. Therefore, the projecting portions 136, which are commonly arranged on the center side of the pixel excluding the outer periphery thereof, and the liquid-crystal-layer-thickness adjusting layer 137 (liquid-crystal-layer-thickness adjusting portion 138) can be easily configured in such a manner as to satisfy the above-described structure of item 2. (1).

(3) The structure described above in item 2. (3) allows more reliable formation of the projecting portion 136a along the side surface (edge portion) of the liquid-crystal-layer-thickness adjusting layer 137 (liquid-crystal-layer-thickness adjusting portion 138) without leaving a gap between the projecting portion 136a and the liquid-crystal-layer-thickness adjusting layer 137 (liquid-crystal-layer-thickness adjusting portion 138).

(4) The structure described above in item 2. (4) suppresses light leakage in areas around the projecting portions 136 in the transmissive region T which may lead to a reduction in contrast in transmissive display. Therefore, the contrast can be increased in transmissive display. In addition, the outer peripheral portion (edge portion) of the liquid-crystal-layer-thickness adjusting layer 137 (liquid-crystal-layer-thickness adjusting portion 138), which may cause alignment disorder of the liquid crystal, can be placed under the projecting portion 136a or in the non-display region at the outer periphery of the pixel. Therefore, the contrast can be further increased in transmissive display. Here, also in the case that the projecting portions 136 are placed in the reflective region R, there is a concern about light leakage in areas around the projecting portions 136. However, in practice, when the projecting portions 136 are placed in the reflective region R, the areas around the projecting portions 136 can be effectively used for reflective display, unlike the case in which the projecting portions 136 are placed in the transmissive region T.

As described above, according to the present embodiment, the alignment disorder of the liquid crystal can be suppressed. In addition, the VR characteristics can be adjusted without impairing the transmission contrast characteristics.

4. Modifications (1) In the present embodiment, the liquid-crystal-layer-thickness adjusting layer 137 is formed only in the area of the reflective region R which is surrounded by the projecting portion 136a on the center side of the pixel and the outer periphery of the pixel. However, the liquid-crystal-layer-thickness adjusting layer 137 (liquid-crystal-layer-thickness adjusting portion 138) may also be formed in areas of the reflective region R which are surrounded by the projecting portions other than the projecting portion 136a (e.g., the projecting portions 136b and 136c) in the upper and lower corners of the pixel and the outer periphery of the pixel.

(2) In the present embodiment, the reflective film 115 is the topmost layer (closest to the liquid crystal layer 150) among the layered conductive components. However, the reflective film 115 may instead be formed under (closer to the glass substrate 111 than) the pixel electrode 113.

(3) In the present embodiment, the insulating layer 112 has an irregular pattern for diffusing the reflected light in areas corresponding to the reflective region R in the first substrate 110. However, instead of forming the irregular pattern, the circularly polarizing plate disposed outside the second substrate 130 may be configured to provide a light diffusing function.

(4) Although only the projecting portions 136a, 136b, and 136c are provided as the projecting portions 136 in the present embodiment, other projecting portions may also be provided.

Second Embodiment

1. Overall Structure

Figure 2:
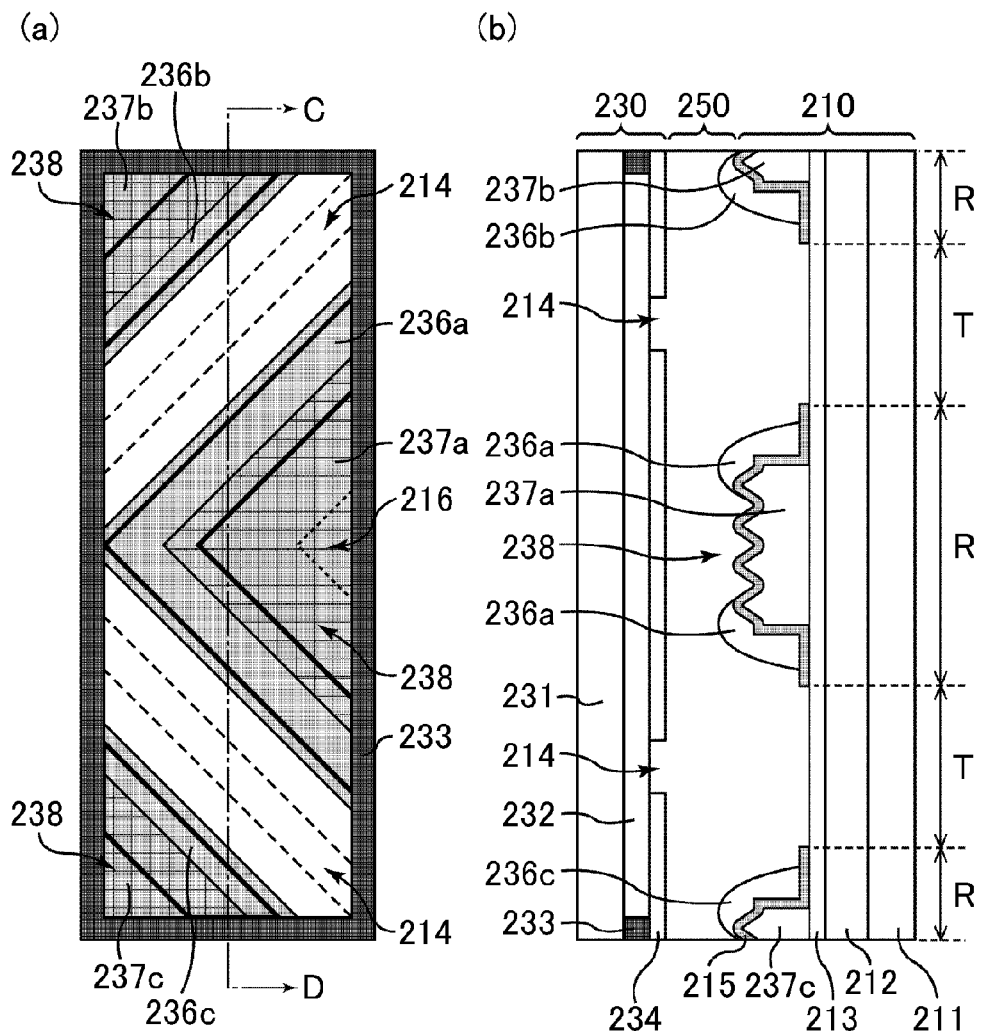
FIG. 2 are schematic diagrams each illustrating a liquid crystal display device according to a second embodiment.

As illustrated in FIG. 2, a liquid crystal display device according to the present embodiment is a vertical alignment liquid crystal display device including a first substrate 210 on a back side, a liquid crystal layer 250 similar to the liquid crystal layer 150 of the first embodiment, and a second substrate 230 on a screen side, which are arranged in this order.

Similar to the first embodiment, the liquid crystal display device according to the present embodiment is a transflective liquid crystal display device including a reflective region R and a transmissive region T, more specifically, a normally black liquid crystal display device including a pair of circularly polarizing plates (not shown) and a pair of linearly polarizing plates (not shown). A backlight (not shown) is disposed behind the linearly polarizing plate on the side of the first substrate 210.

The second substrate 230 includes the following components arranged in the mentioned order: a glass substrate 231; a color layer 232 and a black matrix 233 formed on the glass substrate 231; a counter electrode 234 formed on the color layer 232 and the black matrix 233; and a vertical alignment film (not shown) that covers these components.

The color layer 232 and the black matrix 233 are formed of, for example, an acrylic resin containing pigment. The counter electrode 234 is provided in common for each pixel to drive the liquid crystal, and is formed of a transparent conductive film, such as an ITO film. The vertical alignment film is formed of polyimide resin.

When viewed in a direction perpendicular to the display surface, the counter electrode 234 has slits 214 (regions shown by broken lines in FIG. 2(a)) that extend parallel to projecting portions 236, which will be described below. The counter electrode 234 is sectioned into parts by the slits 214, and the parts are connected to each other by connecting portions (not shown) that are provided in a part of the regions shown by the broken lines in FIG. 2(a). In addition, when viewed in a direction perpendicular to the display surface, the counter electrode 234 has a substantially triangular cut portion 216 (region shown by dotted lines in FIG. 2(a)) that have sides parallel to sides of a projecting portion 236a, which will be described below.

The slits 214 and the cut portion 216 are also structure elements for controlling (regulating) the alignment of the liquid crystal (alignment-controlling structure elements). The slits 214 and the cut portion 216 generate an oblique electric field so as to regulate the tilting direction of the liquid crystal in a vertically aligned state when a voltage is applied.

Instead of forming the slits 214 and the cut portion 216 in the counter electrode 234, projecting portions made of a resin and having certain inclined surfaces may be formed, for example, on the counter electrode 234. This can also regulate the tilting direction of liquid crystal molecules.

The first substrate 210 includes the following components arranged in the mentioned order: a glass substrate 211; an insulating layer (interlayer insulating film) 212 formed on a side of the glass substrate 211 which faces the liquid crystal layer 250; a pixel electrode 213 formed on the insulating layer 212; liquid-crystal-layer-thickness adjusting layers 237 (regions hatched with a grid pattern in FIG. 2(a)) formed on the pixel electrode 213; a reflective film (reflective electrode) 215 formed on the pixel electrode 213 and the liquid-crystal-layer-thickness adjusting layers 237; projecting portions 236 (236a, 236b, and 236c) formed on the reflective film 215; and a vertical alignment film (not shown) that covers these components.

The insulating layer 212 is formed of a dielectric material (insulating film), such as an acrylic resin. The pixel electrode 213 is provided for each pixel to drive the liquid crystal, and is formed of a transparent conductive film, such as an ITO film. The liquid-crystal-layer-thickness adjusting layers 237 are formed of a dielectric material (insulating film), such as an acrylic resin. The projecting portions 236 are formed of a dielectric material (insulating material), such as a phenolic novolac resin. The reflective film 215 is formed of a film of a metal having a high reflectance, such as aluminum or silver. The vertical alignment film is formed of a polyimide resin.

Similar to the first embodiment, the first substrate 210 has a TFT (not shown), a gate line (not shown), a source line (not shown), a drain electrode (not shown), an auxiliary capacity line (not shown), and etc., between the glass substrate 211 and the insulating layer 212. The pixel electrode 213 is connected to the drain electrode of the TFT through a contact hole (not shown) formed in the insulating layer 212.

The projecting portions (projections) 236 are structure elements for controlling (regulating) the alignment of the liquid crystal (alignment-controlling structure elements), and include inclined surfaces that are inclined with respect to the planes of the substrates 210 and 230 (or with respect to the vertical alignment direction of the liquid crystal). The alignment of the liquid crystal, in particular, a tilting direction of the vertically aligned liquid crystal, is regulated along the inclinations of the inclined surfaces. More specifically, owing to the inclined surfaces of the projecting portions 236, the liquid crystal near the projecting portions 236 is aligned obliquely (in directions perpendicular to the inclined surfaces). When a display surface is viewed from the front, the projecting portions 236 extend obliquely and include a V-shaped projecting portion 236a positioned on a center side of a pixel and linear projecting portions 236b and 236c positioned in upper and lower corners of the pixel. The projecting portions 236, the slits 214, and the cut portion 216 regulate the alignment of the liquid crystal.

The liquid-crystal-layer-thickness adjusting layers 237 constitute liquid-crystal-layer-thickness adjusting portions 238 that locally adjust a liquid crystal layer thickness (thickness of the liquid crystal layer 250) by its own thickness. The liquid-crystal-layer-thickness adjusting portions 238 are provided in the reflective region R so that the liquid crystal layer thickness (thickness of the liquid crystal layer 250) in the transmissive region T is greater than the liquid crystal layer thickness (thickness of the liquid crystal layer 250) in the reflective region R. Thus, the liquid crystal display device of the present embodiment has a multi-gap structure in which the liquid crystal layer thickness (cell gap) differs between the transmissive region T and the reflective region R.

The liquid-crystal-layer-thickness adjusting layers 237 are selectively disposed in all of the areas surrounded by the projecting portions 236 (the projecting portions 236a, 236b, and 236c) and boundary lines between adjacent pixels (the outer periphery of each pixel). The projecting portions 236 are arranged without gaps along the outer peripheries (edge portions) of the liquid-crystal-layer-thickness adjusting layers 237 on the center side of the pixel. In other words, the liquid-crystal-layer-thickness adjusting portions 238 are selectively provided in the entire area surrounded by the projecting portions 236 and the boundary lines between adjacent pixels (the outer periphery of each pixel), and the projecting portions 236 are arranged without gaps along step portions of the liquid-crystal-layer-thickness adjusting layers 237 on the center side of the pixel. Thus, the projecting portions 236 are arranged without gaps along longitudinal directions of portions of side surfaces of the liquid-crystal-layer-thickness adjusting portions 238 excluding portions positioned on the boundary lines between pixels. The liquid-crystal-layer-thickness adjusting layers 237 include a liquid-crystal-layer-thickness adjusting layer 237a having a substantially triangular shape in a plan view and positioned on the center side of the pixel and liquid-crystal-layer-thickness adjusting layers 237b and 237c positioned in upper and lower corners of the pixel. The liquid-crystal-layer-thickness adjusting layers 237 have an irregular pattern on the side thereof that faces the liquid crystal layer 250. The reflective film 215 formed on the irregular pattern also has a similar irregular pattern.

Owing to the presence of the liquid-crystal-layer-thickness adjusting layers 237, the thickness of the liquid crystal layer 250 in the reflective region R is smaller than the thickness of the liquid crystal layer 150 in the transmissive region T. As a result, retardation in the reflective region R and retardation in the transmissive region T can be set sufficiently close to each other or substantially equal to each other. Therefore, satisfactory VR characteristics which suppress tone reversal can be achieved.

The reflective film 215 reflects incident light (external light and the like) from the screen side of the liquid crystal display device. The region in which the reflective film 215 is provided corresponds to the reflective region R. The reflective film 215 is in contact with the pixel electrode 213 in areas where the liquid-crystal-layer-thickness adjusting layers 237 are not provided, and is thereby electrically connected to the pixel electrode 213. The region in which the reflective film 215 is not provided corresponds to the transmissive region T.

When viewed in a direction perpendicular to the display surface, the reflective film 215 (the reflective region R) is arranged in such a manner as to cover all of the regions where the projecting portions 236 are provided in the pixel. Accordingly, the reflective region R includes at least a first region, a second region, and a third region. In the first region, the projecting portions 236 are not present but the liquid-crystal-layer-thickness adjusting portions 238 are present. In the second region, the projecting portions 236 are present. In the third region, neither the projecting portions 236 nor the liquid-crystal-layer-thickness adjusting portions 238 are present. Therefore, combination of at least the VR characteristics in the first region, the VR characteristics in the second region, and the VR characteristics in the third region determines the VR characteristics of the reflective region R.

The thickness of the liquid-crystal-layer-thickness adjusting layers 237, namely, the liquid crystal layer thickness at the liquid-crystal-layer-thickness adjusting portions 238, is not particularly limited. The thickness may be set as appropriate so that satisfactory VR characteristics can be achieved. The area of the liquid-crystal-layer-thickness adjusting layers 237 (liquid-crystal-layer-thickness adjusting portions 238) is also not particularly limited, and may be set as appropriate so that satisfactory VR characteristics can be achieved.

2. Main Structural Features (1) Different from the first embodiment, the projecting portions 236 and the liquid-crystal-layer-thickness adjusting layers 237 (which corresponds to the liquid-crystal-layer-thickness adjusting portions 238 in the present embodiment and the same shall apply in the following) are provided on the first substrate 210. The projecting portions 236 are formed along the edge portions of the liquid-crystal-layer-thickness adjusting layers 237 (which correspond to step portions of the liquid-crystal-layer-thickness adjusting portions 238 in the present embodiment and the same shall apply in the following) without leaving gaps between the projecting portions 236 and the liquid-crystal-layer-thickness adjusting layers 237. In other words, the projecting portions 236 are formed along the side surfaces of the liquid-crystal-layer-thickness adjusting portions 238 without leaving gaps between the projecting portions 236 and the liquid-crystal-layer-thickness adjusting portions 238. Accordingly, the slits 214 and the cut portion 216 are formed in the counter electrode 234 included in the second substrate 230.

In addition, the present embodiment also has the above-described structural features described in items 2. (2) to 2. (4) according to the first embodiment. However, the present embodiment differs from the first embodiment in that the liquid-crystal-layer-thickness adjusting layers 237 (liquid-crystal-layer-thickness adjusting layers 237b and 237c) are also provided along the projecting portions 236b and 236c positioned in the upper and lower corners of the pixel.

3. Advantageous Effects (1) The structure described above in item 2. (1) of the present embodiment allows the side surfaces (edge portions) of the liquid-crystal-layer-thickness adjusting layers 237 to be arranged under the projecting portions 236. Therefore, the alignment of the liquid crystal near the side surfaces (edge portions) of the liquid-crystal-layer-thickness adjusting layers 237, which may adversely affect the alignment of the liquid crystal, can be controlled by the projecting portions 236. Thus, in the liquid crystal display device having a multi-gap structure, the alignment disorder of the liquid crystal due to the liquid-crystal-layer-thickness adjusting portions 238 can be suppressed. In addition, this structure allows adjustment of the thickness of the liquid-crystal-layer-thickness adjusting layers 237 for setting the liquid crystal layer thickness in the reflective region R to be smaller than the liquid crystal layer thickness in the transmissive region T. Therefore, the liquid crystal layer thickness in the reflective region R can be set in a manner such that satisfactory VR characteristics can be achieved.

In addition, also in the present embodiment, effects similar to those described above in items 3. (2) to 3. (4) in the first embodiment can be obtained. The present embodiment differs from the first embodiment in that the above-mentioned effects can also be obtained at the upper and lower corners of each pixel.

The projecting portions 236 are arranged without gaps along portions of the side surfaces (edge portions) of the liquid-crystal-layer-thickness adjusting layers 237 (liquid-crystal-layer-thickness adjusting portions 238) that are positioned on the center side of the pixel. Therefore, the projecting portions 236, which are commonly arranged on the center side of the pixel excluding the outer periphery of the pixel, and the liquid-crystal-layer-thickness adjusting layers 237 (liquid-crystal-layer-thickness adjusting portions 238) can be easily configured in such a manner as to satisfy the above-described structure of item 2. (1).

As described above, according to the present embodiment, the alignment disorder of the liquid crystal can be suppressed. In addition, the VR characteristics can be adjusted without impairing the transmission contrast characteristics.

4. Modifications (1) In the present embodiment, the liquid-crystal-layer-thickness adjusting layers 237 have an irregular pattern for diffusing the reflected light. However, instead of forming the irregular pattern, the circularly polarizing plate disposed outside the second substrate 230 may be configured to provide a light diffusing function.

(2) Although only the projecting portions 236a, 236b, and 236c are provided as the projecting portions 236 in the present embodiment, other projecting portions may also be provided.

As described above, in the liquid crystal display devices according to the first and second embodiments, the liquid-crystal-layer-thickness adjusting portions are formed in areas surrounded by the projecting portions and the outer periphery of the pixel in the reflective region. Here, the adjusting portions are formed along the projecting portions such that no gap is provided therebetween. To realize this configuration, the projecting portions are preferably formed in such a manner as to overlap the liquid-crystal-layer-thickness adjusting portions. The liquid-crystal-layer-thickness adjusting portions formed in this manner allows the side surfaces (edge portions, step portions) of the adjusting portions to be arranged at positions where the alignment of the liquid crystal is divided. Therefore, the liquid crystal layer thickness in the reflective region can be adjusted without influencing the alignment direction of the liquid crystal in both the transmissive region and the reflective region. Thus, satisfactory VR characteristics which avoid tone reversal can be achieved.

In addition, in the first and second embodiments, the liquid-crystal-layer-thickness adjusting portions are formed along the projecting portions. In other words, the projecting portions do not cross the side surfaces (longitudinal directions of the side surfaces) of the liquid-crystal-layer-thickness adjusting portions. Therefore, unlike the prior art disclosed in Patent Document 1, even when the liquid-crystal-layer-thickness adjusting portions are formed, the alignment disorder of the liquid crystal due to projections provided on one of the substrates and alignment-controlling structure elements (e.g., slits) provided on the other one of the substrates can be suppressed in both the transmissive region and the reflective region. In addition, unlike the prior art disclosed in Patent Document 1, even when the liquid-crystal-layer-thickness adjusting portions are provided, the alignment of the liquid crystal can be set to an alignment direction equivalent (similar) to that in the case where the liquid-crystal-layer-thickness adjusting portions are not provided. Furthermore, according to the first and second embodiments, all of the projecting portions are arranged in the reflective region, unlike the prior art disclosed in Patent Document 1.

Variations in positional relationships between the projecting portions and the liquid-crystal-layer-thickness adjusting portions according to the first and second embodiments will now be described. In any case, the height H1 of the projecting portions (only the projecting portions formed without gaps along the liquid-crystal-layer-thickness adjusting portions) and the height H2 of the liquid-crystal-layer-thickness adjusting portions at least satisfy H1≥H2. In addition, in the first and second embodiments, a thickness T1 of the projecting portions and a thickness T1 of the liquid-crystal-layer-thickness adjusting layers satisfy T1≥T2.

The taper angle of the projecting portions is not particularly limited in the first and second embodiments, but may commonly be set to about 15° to 30°. In addition, the width of the projecting portions is not particularly limited in the first and second embodiments, but may commonly be set to about 5 to 20 µm.

Figure 3:
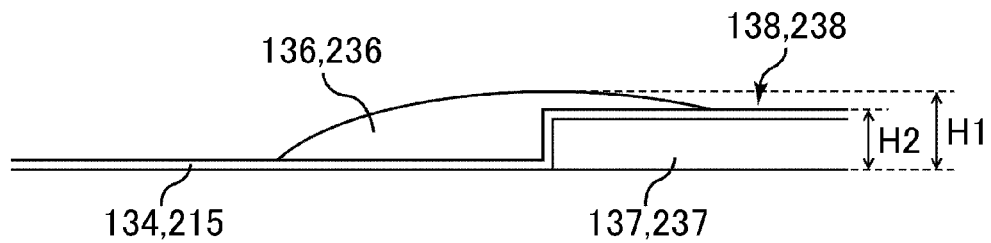
FIG. 3 is a schematic cross-sectional view illustrating an area around a projecting portion and a liquid-crystal-layer-thickness adjusting portion in the liquid crystal display device according to the first or second embodiment.

As illustrated in FIG. 3, the projecting portions 136 and 236 may be arranged in such a manner as to overlap the liquid-crystal-layer-thickness adjusting portions 138 and 218 (liquid-crystal-layer-thickness adjusting layers 137 and 237). In this case, the taper angle of the liquid-crystal-layer-thickness adjusting portions 138 and 238 (liquid-crystal-layer-thickness adjusting layers 137 and 237) is not particularly limited, and may be set as appropriate.

Figure 4:
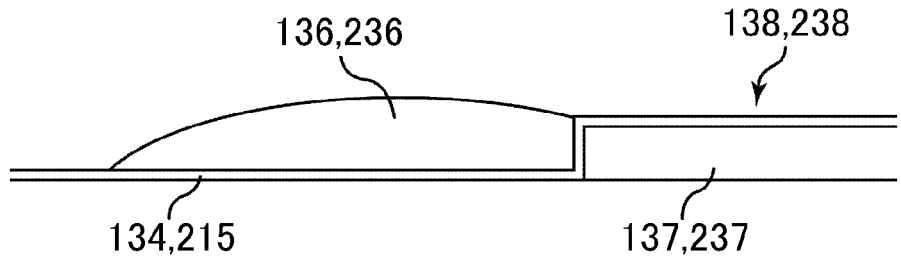
FIG. 4 is a schematic cross-sectional view illustrating an area around a projecting portion and a liquid-crystal-layer-thickness adjusting portion in the liquid crystal display device according to the first or second embodiment.

Alternatively, as illustrated in FIG. 4, the projecting portions 136 and 216 and the liquid-crystal-layer-thickness adjusting portions 138 and 238 (liquid-crystal-layer-thickness adjusting layers 137 and 237) may be arranged without forming a step therebetween. In this case, the taper angle of the liquid-crystal-layer-thickness adjusting portions 138 and 238 (liquid-crystal-layer-thickness adjusting layers 137 and 237) is not particularly limited, and may be set as appropriate.

Figure 5:
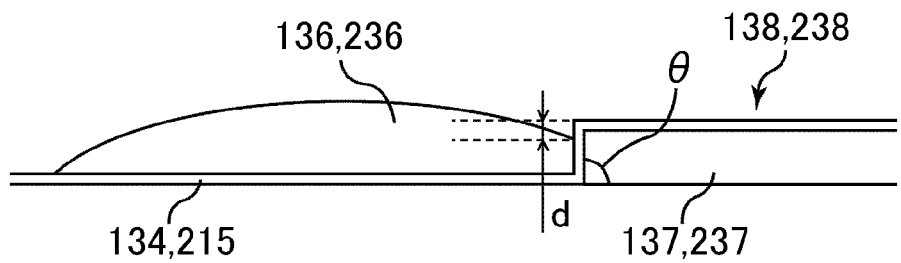
FIG. 5 is a schematic cross-sectional view illustrating an area around a projecting portion and a liquid-crystal-layer-thickness adjusting portion in the liquid crystal display device according to the first or second embodiment.

Alternatively, as illustrated in FIG. 5, the projecting portions 136 and 216 and the liquid-crystal-layer-thickness adjusting portions 138 and 238 (liquid-crystal-layer-thickness adjusting layers 137 and 237) may be respectively arranged such that a level difference d is provided but no gap is provided therebetween. In this case, the level difference d is preferably less than 0.2 µm in light of the alignment control of the liquid crystal at the projecting portions. However, when the taper angle θ of the liquid-crystal-layer-thickness adjusting portions 138 and 238 (liquid-crystal-layer-thickness adjusting layers 137 and 237) is less than 20°, the level difference d is not particularly limited, and may be set as appropriate.

As described above, the side surfaces of the liquid-crystal-layer-thickness adjusting portions 138 and 238 (liquid-crystal-layer-thickness adjusting layers 137 and 237) may be inclined.

In the first and second embodiments, the projecting portions 136 and 236 and the liquid-crystal-layer-thickness adjusting portions 138 and 238 (liquid-crystal-layer-thickness adjusting layers 137 and 237) are formed as separate elements. However, they may be formed integrally.

Figure 6:
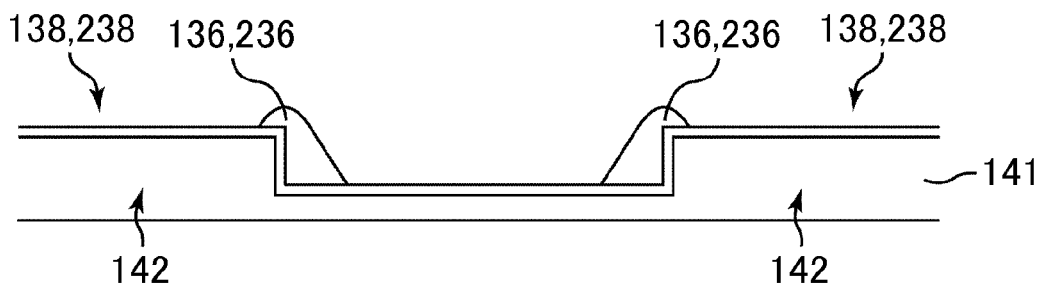
FIG. 6 is a schematic cross-sectional view illustrating an area around projecting portions and liquid-crystal-layer-thickness adjusting portions in the liquid crystal display device according to the first or second embodiment.
Figure 7:
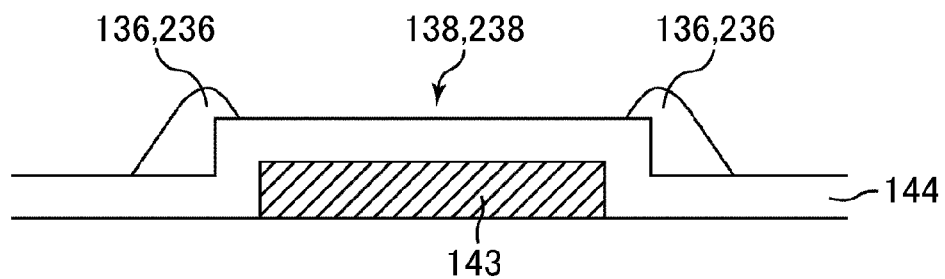
FIG. 7 is a schematic cross-sectional view illustrating an area around projecting portions and a liquid-crystal-layerthickness adjusting portion in the liquid crystal display device according to the first or second embodiment.

In addition, in the first and second embodiments, the projecting portions 136 and 236 are formed along the side surfaces (edge portions) of the liquid-crystal-layer-thickness adjusting portions 138 and 238 (liquid-crystal-layer-thickness adjusting layers 137 and 237). However, as illustrated in FIG. 6, the liquid-crystal-layer-thickness adjusting portions 138 and 238 may be formed as thick portions (thick portions 142) of an insulating film 141 having variations in thicknesses, and the projecting portions 136 and 236 may be formed along the side surfaces (edge portions) of the thick portions 142. Alternatively, as illustrated in FIG. 7, the liquid-crystal-layer-thickness adjusting portions 138 and 238 may comprise an underlayer pattern 143, such as a wire, and an insulating film 144 formed on the underlayer pattern 143. In any case, the projecting portions 136 and 236 may be arranged without gaps along the side surfaces (step portions) of the liquid-crystal-layer-thickness adjusting portions 138 and 238. In the configurations illustrated in FIGS. 6 and 7, the insulating layer (interlayer insulating film) formed in the first substrate, for example, may be used as the liquid-crystal-layer-thickness adjusting portions.

Figure 8:
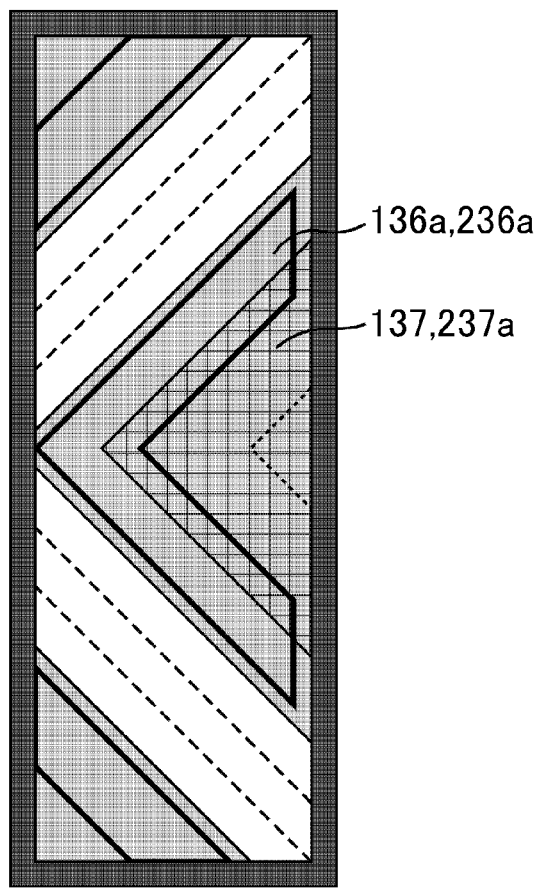
FIG. 8 is a schematic plan view illustrating the liquid crystal display device according to the first or second embodiment.

In the first and second embodiments, the projecting portions 136a and 236a are arranged along the entireties of the portions of the side surfaces (edge portions or step portions) of the liquid-crystal-layer-thickness adjusting layers 137 and 237a (liquid-crystal-layer-thickness adjusting portions 138 and 238) on the center side of the pixel. However, as illustrated in FIG. 8, the projecting portions 136a and 236a may be arranged along a part of the portions of the side surfaces (edge portions or step portions) of the liquid-crystal-layer-thickness adjusting layers 137 and 237a (liquid-crystal-layer-thickness adjusting portions 138 and 238) on the center side of the pixel.

In addition, in the first and second embodiments, the entireties of the projecting portions 136a and 236a are arranged along the side surfaces (edge portions or step portions) of the liquid-crystal-layer-thickness adjusting layers 137 and 237a (liquid-crystal-layer-thickness adjusting portions 138 and 238). However, the projecting portions 136a and 236a may instead be formed in such a manner as to be arranged partly along the side surfaces (edge portions or step portions) of the liquid-crystal-layer-thickness adjusting layers 137 and 237a (liquid-crystal-layer-thickness adjusting portions 138 and 238). For example, the projecting portions 136a and 236a may be formed in such a manner as to be arranged along the side surfaces (edge portions) of the liquid-crystal-layer-thickness adjusting layers 137 and 237a (liquid-crystal-layer-thickness adjusting portions 138 and 238) except for both end portions thereof. Alternatively, the projecting portions 136a and 236a may include auxiliary projecting portions that do not extend along the side surfaces (edge portions) of the liquid-crystal-layer-thickness adjusting layers 137 and 237a (liquid-crystal-layer-thickness adjusting portions 138 and 238).

The present application claims priority to Patent Application No. 2009-070895 filed in Japan on Mar. 23, 2009 under the Paris Convention and provisions of national law in a designated State, the entire contents of which are hereby incorporated by reference.

EXPLANATION OF NUMERALS AND SYMBOLS 110, 210: first substrate
111, 211: glass substrate
112, 212: insulating layer
113, 213: pixel electrode
114, 214: slit
115, 215: reflective film
116, 216: cut portion
130, 230: second substrate
131, 231: glass substrate
132, 232: color layer
133, 233: black matrix
134, 234: counter electrode
136, 236: projecting portion
137, 237: liquid-crystal-layer-thickness adjusting layer
138, 238: liquid-crystal-layer-thickness adjusting portion
141, 144: insulating film
142: thick portion
143: underlayer pattern
150, 250: liquid crystal layer
T: transmissive region
R: reflective region

The invention claimed is:

1. A liquid crystal display device comprising
a pair of substrates and
a liquid crystal layer interposed between the pair of substrates,
the liquid crystal display device having a reflective region and a transmissive region,
wherein liquid crystal in the liquid crystal layer is vertically aligned in an initial alignment state,
wherein the liquid crystal layer comprises a nematic liquid crystal material with a negative dielectric anisotropy,
wherein each of the air of substrates includes a vertical alignment film,
wherein one of the pair of substrates includes a longitudinal projecting portion as an alignment-controlling structure element and a liquid-crystal-layer-thickness adjusting portion for setting a liquid crystal layer thickness in the reflective region to be smaller than a liquid crystal layer thickness in the transmissive region,
wherein the projecting portion is extended without a gap along at least a part of a side surface of the liquid-crystal-layer-thickness adjusting portion,
wherein the other of the pair or substrates includes a second alignment-controlling structure element extended parallel to the projecting portion, and
wherein the projecting portion and the second alignment-controlling structure element are arranged with a gap therebetween when a display surface is viewed from a front.

2. The liquid crystal display device according to claim 1, wherein the projecting portion overlaps the liquid-crystal-layer-thickness adjusting portion.

3. The liquid crystal display device according to claim 1, wherein a height H1 of the projecting portion and a height H2 of the liquid-crystal-layer-thickness adjusting portion satisfy the relationship H1≥H2.

4. The liquid crystal display device according to claim 1, wherein the liquid-crystal-layer-thickness adjusting portion includes a liquid-crystal-layer-thickness adjusting layer for setting the liquid crystal layer thickness in the reflective region to be smaller than the liquid crystal layer thickness in the transmissive region.

5. The liquid crystal display device according to claim 1, wherein the projecting portion is extended without a gap along at least a part of a portion of the side surface, the portion being positioned on a center side of a pixel.

6. The liquid crystal display device according to claim 1, wherein the projecting portion is extended without a gap along the entirety of a portion of the side surface, the portion being positioned on a center side of a pixel.

7. The liquid crystal display device according to claim 6, wherein a portion of the side surface which does not adjoin the projecting portion is arranged along a boundary line between pixels.

8. The liquid crystal display device of claim 1, wherein the substrate not including the projecting portion includes a reflective electrode provided in the reflective region.

9. The liquid crystal display device of claim 1, wherein the substrate including the projecting portion includes a reflective electrode provided in the reflective region.

10. The liquid crystal display device of claim 1, wherein the reflective region includes a region in which neither the projecting portion nor the liquid-crystal-layer-thickness adjusting portion is present.

11. The liquid crystal display device of claim 1, wherein the substrate including the projecting portion includes an insulating film including a thick portion and a thin portion,
wherein the liquid-crystal-layer-thickness adjusting portion includes the thick portion of the insulating film, and
wherein the projecting portion is extended along a side surface of the thick portion.

12. The liquid crystal display device of claim 1, wherein the liquid-crystal-layer-thickness adjusting portion includes a wiring pattern and an insulating film on the wiring pattern.

13. The liquid crystal display device of claim 1, wherein the projecting portion is extended obliquely when a display surface is viewed from a front.

* * * * *